(12) United States Patent
Vondenhuevel et al.

(10) Patent No.: US 6,379,097 B1
(45) Date of Patent: Apr. 30, 2002

(54) TILT RACK APPARATUS

(75) Inventors: Jon Vondenhuevel; David Davis, both of St. Marys, OH (US)

(73) Assignee: Our Gang Welding Inc., St. Marys, OH (US)

( * ) Notice: Subject to any disclaimer, the term of this patent is extended or adjusted under 35 U.S.C. 154(b) by 0 days.

(21) Appl. No.: 09/562,100

(22) Filed: May 1, 2000

(51) Int. Cl.⁷ .............................................. B65G 65/23
(52) U.S. Cl. ...................................... 414/414; 414/421
(58) Field of Search ......................... 248/140; 414/778, 414/414, 421

(56) References Cited

U.S. PATENT DOCUMENTS

| 1,797,471 A | | 3/1931 | Jones |
| 1,937,668 A | * | 12/1933 | Pine ........................ 414/421 X |
| 2,770,491 A | | 11/1956 | Perko |
| 2,874,860 A | * | 2/1959 | King ..................... 414/419 M |
| 3,294,266 A | * | 12/1966 | Snow ........................... 414/421 |
| 4,070,060 A | | 1/1978 | Howard ........................... 298/2 |
| 5,350,030 A | | 9/1994 | Mawhinney et al. ........ 180/19.3 |
| 5,562,401 A | * | 10/1996 | Drew et al. .................. 414/778 |
| 5,755,816 A | * | 5/1998 | Schirmer .................... 414/768 |

FOREIGN PATENT DOCUMENTS

| EP | 0134095 | * | 3/1985 | .................. 414/421 |
| FR | 1363385 | * | 12/1964 | .................. 414/414 |
| GB | 2 195 975 | | 4/1988 | |
| GB | 2211480 | * | 7/1989 | .................. 414/421 |
| GB | 2223733 | * | 4/1990 | .................. 414/421 |

OTHER PUBLICATIONS

Grainger Catalog No. 389, pp 2177 and 2179 and related materials (1998–99).

* cited by examiner

*Primary Examiner*—Steven A. Bratlie
(74) *Attorney, Agent, or Firm*—Miles & Stockbridge P.C.

(57) ABSTRACT

A tilt rack apparatus comprises a rectangular frame supported on a rectangular base for pivotal movement between a horizontal position and a tilted position. A foot-operated latch mechanism maintains the frame in one or the other of the positions. The frame supports a container, such as a parts basket. The container is set on the frame with the frame in the horizontal position, and when the latch is released, the frame and container are moved to the tilted position. Then, when the container is unloaded and the latch mechanism is released, the frame and container are returned to the horizontal position automatically by gas spring shock absorbers.

20 Claims, 4 Drawing Sheets

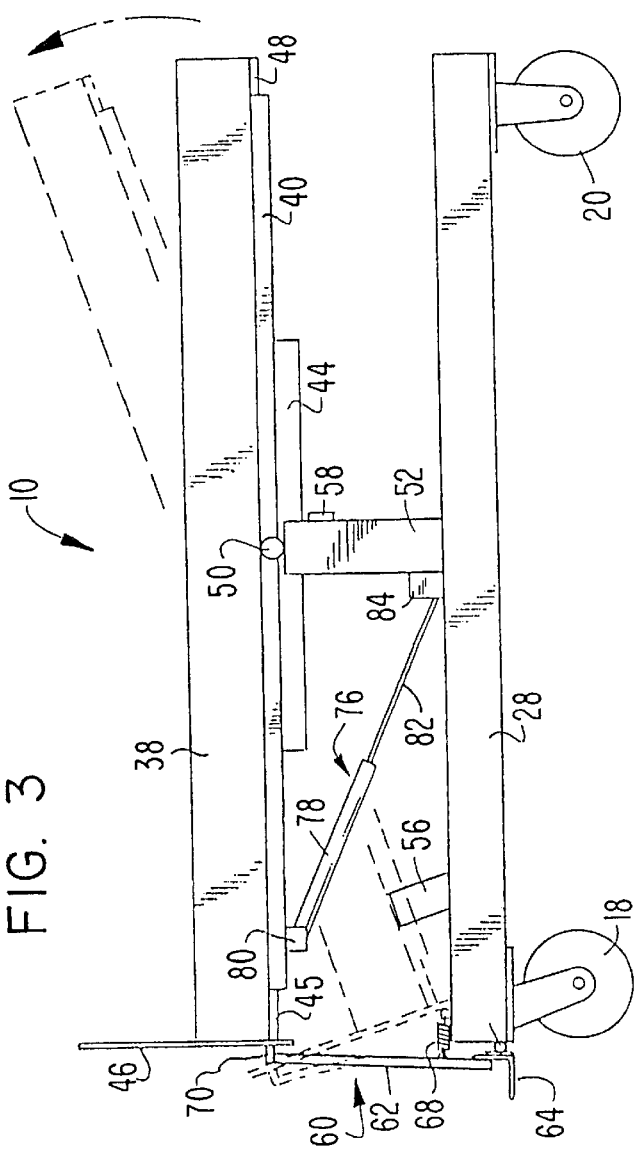
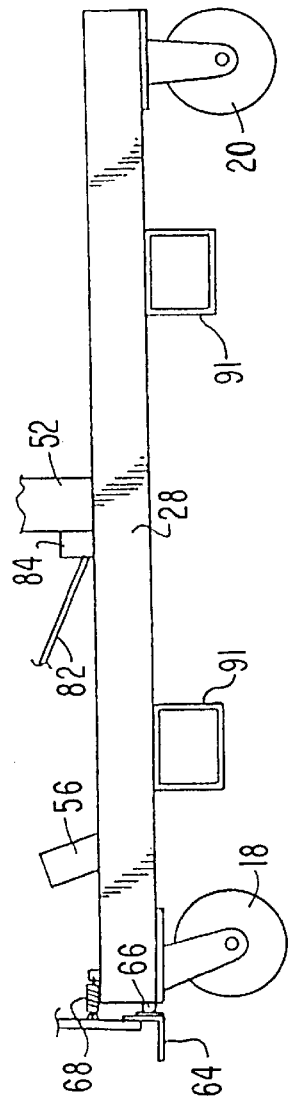
FIG. 3
FIG. 3A

TILT RACK APPARATUS

BACKGROUND OF THE INVENTION

This invention is concerned with tilt rack apparatus and is more particularly concerned with a novel non-powered tilt rack.

Tilt racks, also referred to as tilt tables, are commonly used in industries such as manufacturing and warehousing for supporting various types of containers or other loads in a tilted position. For example, electrically or hydraulically powered tilt racks are employed with crates, boxes and baskets to aid in loading and unloading of parts.

BRIEF DESCRIPTION OF THE INVENTION

The present invention provides a novel tilt rack apparatus that is simple, versatile, and economical and that is easy to operate and maintain. It is adaptable for use with many different types and sizes of containers. In a horizontal position, the tilt rack apparatus can be used as a transport cart or as a stationary work platform. In a tilted position it facilitates loading and unloading of parts, for example.

Briefly stated, in one of its broader aspects, a tilt rack apparatus of the invention comprises a base, a frame supported on the base for pivotal movement between a first, substantially horizontal position and a second, tilted position in which one end of the frame approaches one end of the base, a latch mechanism to releasably hold the frame in one or the other of the first and second positions, and a spring mechanism that moves the frame from the second position to the first position when the latch mechanism is released with the frame in the second position.

BRIEF DESCRIPTION OF THE DRAWINGS

The invention will be further described in conjunction with the accompanying drawings, which illustrate a preferred (best mode) embodiment, and wherein:

FIG. 3 is a side elevation view of the tilt rack apparatus in a horizontal position, with a tilted position shown in phantom lines;

FIG. 3A is a partial side elevation view corresponding to FIG. 3 and showing a modification;

DETAILED DESCRIPTION OF THE INVENTION

Figure 1:
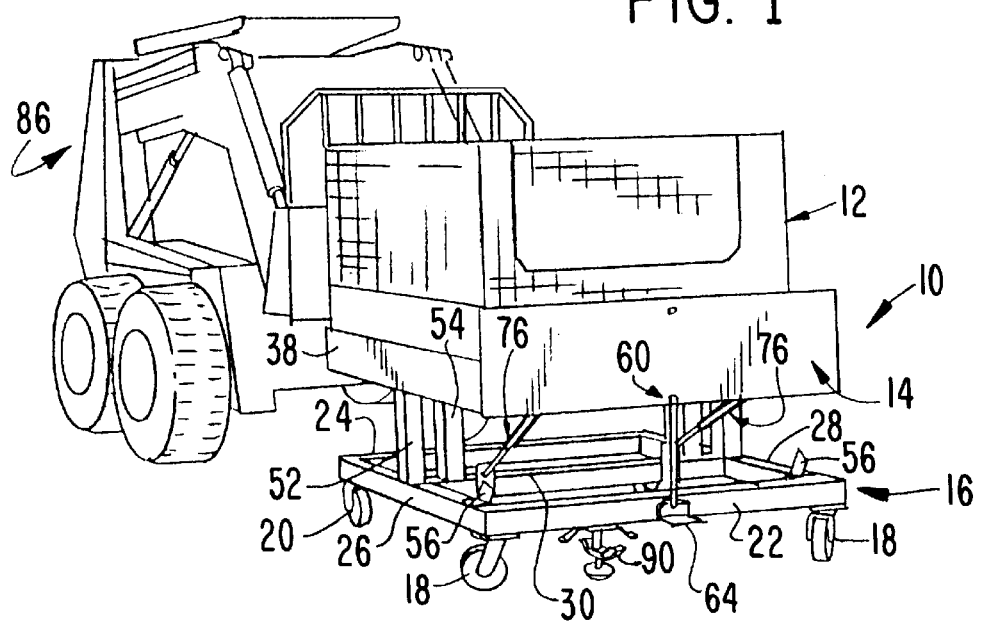
FIG. 1 is a perspective view of a tilt rack apparatus of the invention shown in a horizontal position and having a container set in place by a vehicle.

As shown in the drawings, tilt rack apparatus in accordance with the invention comprises a tilt rack 10 supporting a container 12. The tilt rack comprises a substantially rectangular frame 14 pivotally supported on a substantially rectangular base 16. Casters 18 and 20 are mounted on the four corners of the base to support the base movably on the ground or a floor. In the preferred embodiment, casters 18 at one end of the base (the "front end," simply for identification) are swivel casters, and casters 20 at the opposite end of the base (the "rear end," simply for identification) are rigid casters.

In the form shown, the base 16 comprises substantially parallel structural members 22 and 24 at its respective ends and substantially parallel structural members 26 and 28 at its respective sides. The base also comprises an intermediate structural member 30 extending transversely substantially equidistant from its ends.

Figure 5:
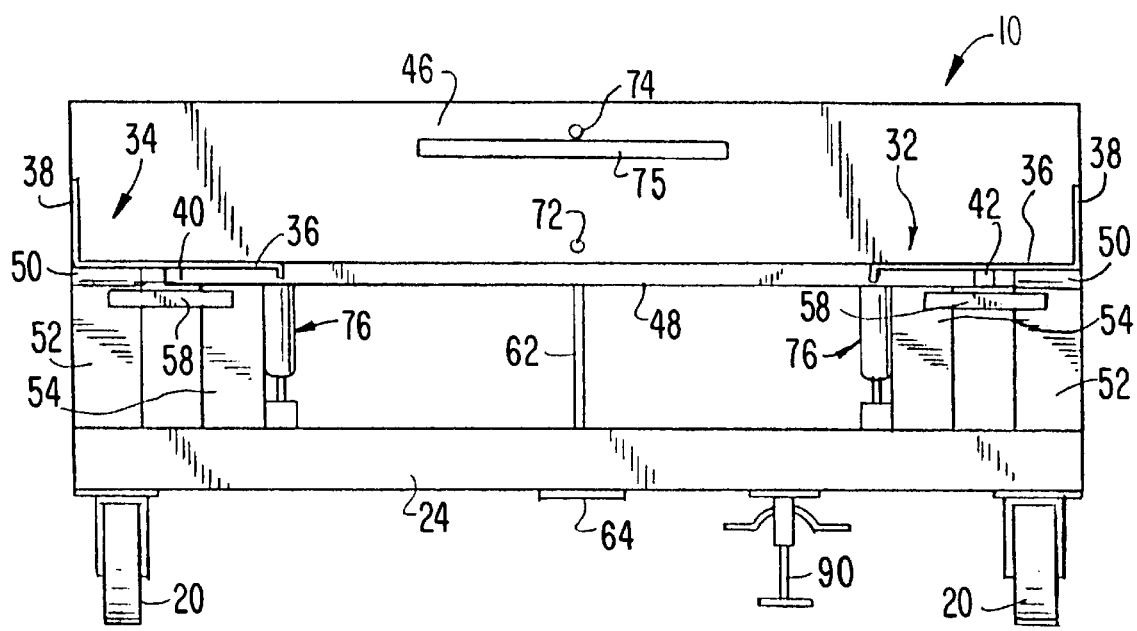
FIG. 5 is a rear elevation view of the tilt rack apparatus in a horizontal position.

The frame 14 comprises a pair of substantially parallel side rails 32 and 34 having substantially coplanar floor portions 36 and outer side portions 38 that extend upwardly from the floor portions perpendicular thereto. The side rails are supported on underlying substantially parallel structural members 40 and 42, which, in turn, are attached to underlying reinforcing members 44, one of which is shown in FIG. 3. The rear ends of the side rails are open as shown in FIG. 5. The front end of the frame has a transverse structural member 45 and a front wall 46 joined to the side rails 32 and 34. The rear end of the frame has a transverse structural member 48 joined to the side rails 32 and 34. Structural members 45 and 48 are substantially parallel. It is apparent that corresponding sides of the base and the frame are substantially parallel and corresponding ends of the base and the frame are substantially parallel when the frame is in the position shown in FIG. 1.

The frame 14 is mounted on the base by hinges 50 midway of the frame for pivotal movement about an axis substantially parallel to the ends of the frame and the base. The hinges are mounted on pairs of posts 52 and 54. Posts 52 extend upwardly from the side structural members 26 and 28 and posts 54 extend upwardly from the intermediate structural member 30. Each hinge comprises three aligned tubes, two of which are mounted on the posts and the other of which is mounted on the frame extending transversely through a structural member 40 or 42. Each hinge also comprises a pin extending through the aligned tubes.

By virtue of the hinges, the frame 14 is supported on the base 16 for pivotal movement between a first, substantially horizontal position (see FIG. 1) and a second, tilted position (see FIG. 2) in which the front end of the frame approaches the front end of the base. Stops 56 mounted on the base limit the downward movement of the frame. Straps 58 extending between the posts of each pair limit the return movement of the frame from the tilted position to the horizontal position.

Figure 6:
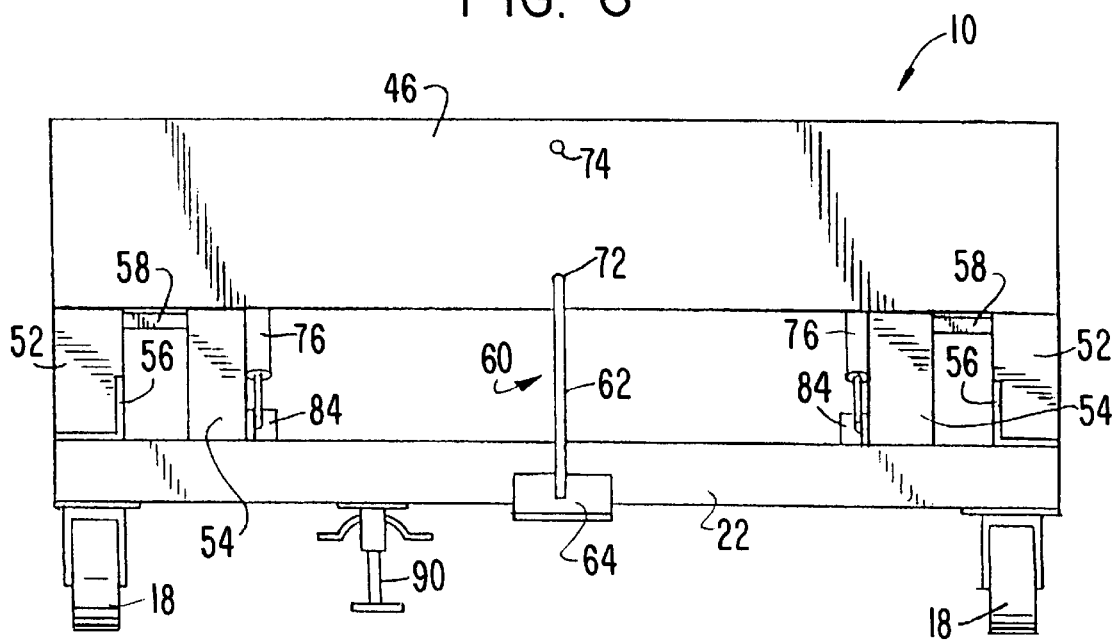
FIG. 6 is a front elevation view of the tilt rack apparatus in a horizontal position.

A latch mechanism 60 is provided at the front of the tilt rack and comprises a rod 62 extending upwardly from a foot pedal 64 pivotally mounted on the front structural member 22 by means of a hinge 66. A coil spring 68 connected between the rod 62 and the front structural member 22 urges the rod to the vertical position shown in FIG. 3. The upper end of the rod is provided with a rearwardly extending projection 70, and the front wall 46 of the frame is provided with a pair of vertically spaced through-holes 72 and 74 as shown in FIGS. 5 and 6. A flat plate 75 is attached to the rear of the front wall a few inches below the upper edge of the front wall to provide additional strengthening in connection with the latch mechanism. The projection 70 at the upper end of the rod 62 is disposed for alignment with one or the other of the through-holes selectively, and the spring bias of the latch mechanism urges the projection into whichever through-hole it is aligned with. The latch mechanism ensures that the frame is held securely, but releasably, at each of its horizontal and tilted positions.

The tilt rack of the invention is provided with a return mechanism comprising a pair of gas spring shock absorbers 76 adjacent to its respective sides. Each gas spring shock absorber has a cylinder 78 pivotally connected to a bracket 80 on the frame and has a piston rod 82 pivotally connected to a bracket 84 on the base.

The gas spring shock absorbers are of a type available from Service Plus Distributors, Inc. of Bensalem, Pa. (such as model SPD-GS-2300). The piston rod 82 extends through a seal at an end of the cylinder remote from the bracket 80 and supports a piston assembly having an orifice therethrough. The cylinder is filled with nitrogen gas and also contains a quantity of hydraulic fluid. The end of the piston facing the bracket 80 has a larger surface area than the opposite end of the piston to which the piston rod is attached, so that even if the gas pressure is the same at opposite sides of the piston, the piston is urged in a direction to extend the piston rod from the cylinder. During the stroke of the piston, gas and hydraulic fluid pass through the orifice. The hydraulic fluid provides end-of-stroke damping when the piston rod approaches its maximum extension.

As shown in FIG. 1, container 12, which may be in the form of a parts basket, for example, has been inserted on the side rails of the frame 14 by a fork lift vehicle 86. This is easily accomplished, because the rear ends of the side rails are open. Once the container 12 has been set on the frame 14, the frame can be moved from its horizontal position (FIG. 1) to its tilted position (FIG. 2) when the operator depresses the pedal 64 to release the latch mechanism 60. Tilting movement of the frame and the container can be assisted by the operator if the distribution of the load in the container is not such as to start the tilting movement automatically when the latch mechanism is released.

The downward force at the front end of the frame is sufficient to overcome the normal tendency of the shock absorbers to extend the piston rods 82, and the piston rods are retracted into the cylinders 78. During this action, the shock absorbers 76 control the rate at which the tilting movement progresses, so that abrupt engagement of the frame with the stops 56 is avoided.

Figure 2:
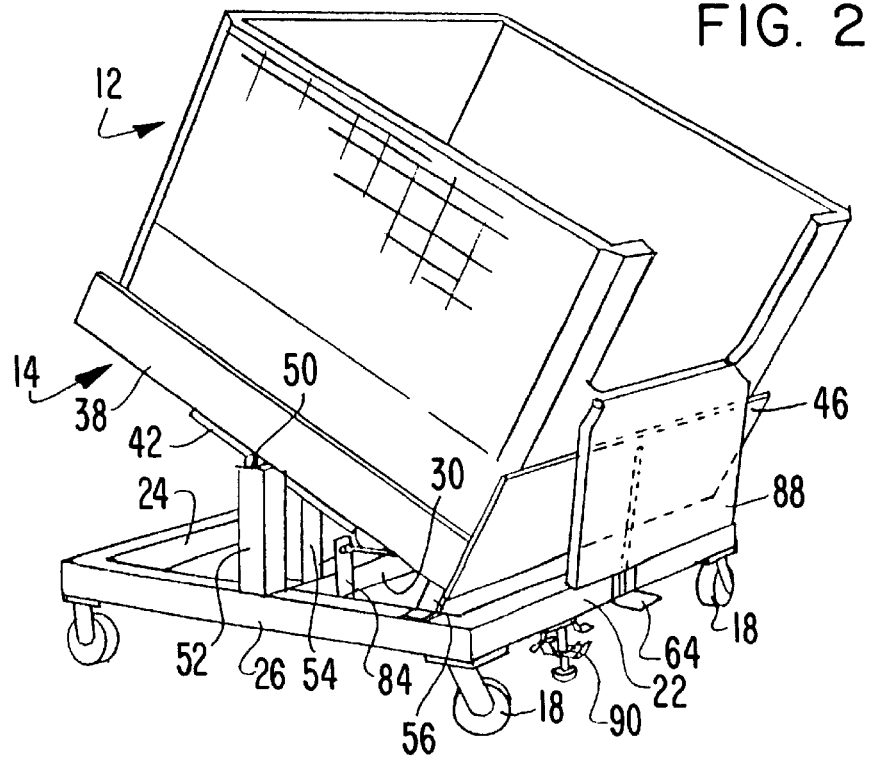
FIG. 2 is a perspective view of the tilt rack apparatus shown in a tilted position with the container opened for unloading.
Figure 4:
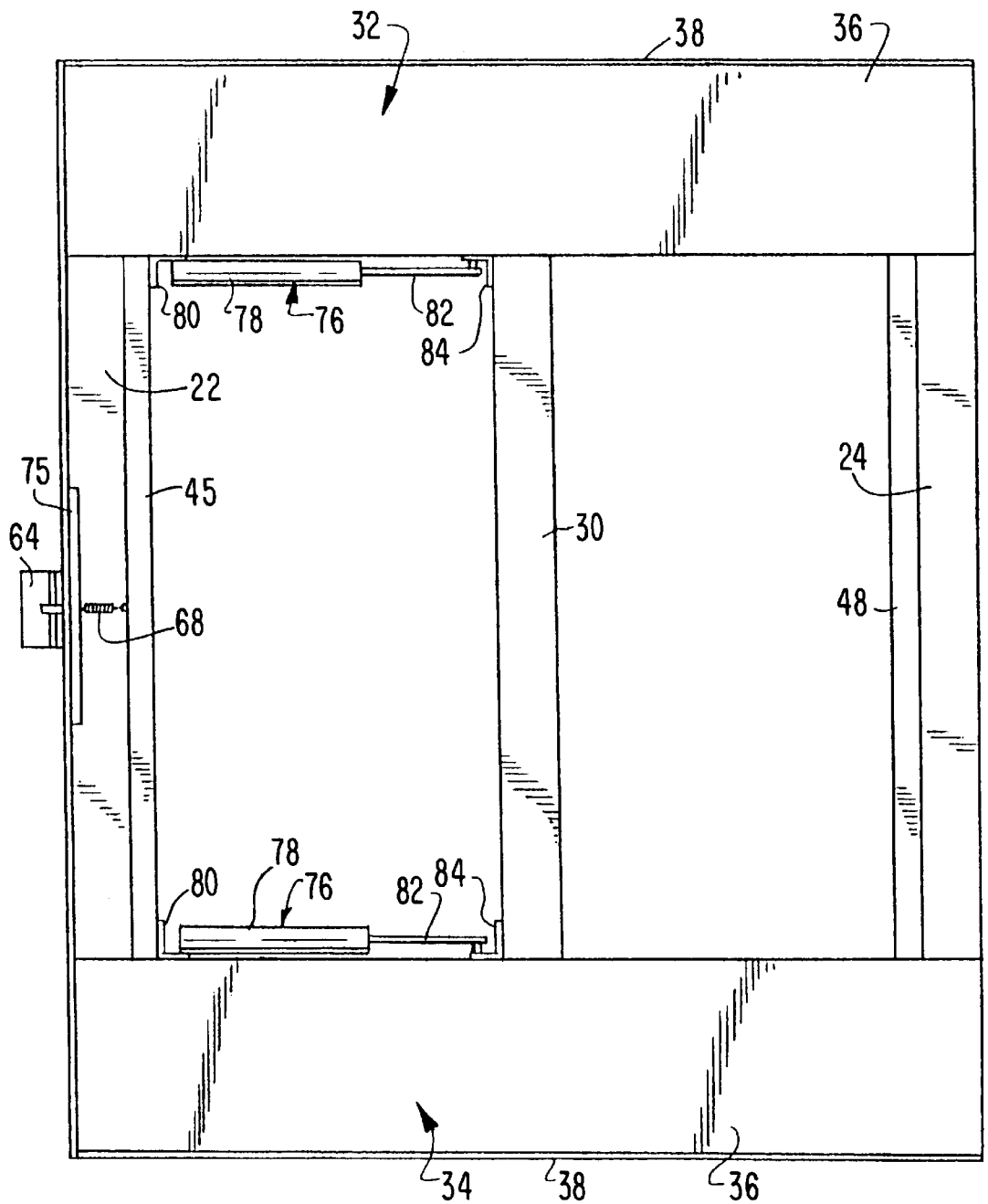
FIG. 4 is a top plan view of the tilt rack apparatus in a horizontal position.

Assuming that the operator is no longer depressing the pedal 64, when the frame and the container reach the tilted position shown in FIG. 2, the projection 70 of the latch mechanism enters the through-hole 74 to latch the frame and container in the tilted position. A hinged door 88 on the container can then be opened as shown in FIG. 2 to facilitate unloading the container. After the container is unloaded, the operator depresses the pedal 64 to release the latch mechanism again, whereupon the gas spring shock absorber 76 automatically extend the piston rods 82 from the cylinder 78 and return the frame to the horizontal position shown in FIG. 1. Assuming that the operator is no longer depressing the pedal 64, the projection 70 enters the through-hole 72 to latch the frame in the horizontal position.

A conventional floor lock 90 (e.g., a Colson floor lock brake) is mounted on the structural member 22 and can be actuated to maintain the tilt rack apparatus of the invention stationary at a work position. Alternatively, the swivel casters 88 and/or the rigid casters 20 can be provided with conventional locks. When the floor lock 90 is not engaged, the tilt rack apparatus can be moved about from place to place as a cart. Also, fork lift tubes 91 (FIG. 3A) can be attached to the base to permit the tilt rack apparatus to be carried by a fork lift vehicle.

In a typical embodiment of the invention, all of the main structural components are formed of steel, and the components are welded together where joints are necessary. The base may be 46 inches long from front to rear and 52 inches wide from side to side. The floor portions of the side rails may be 10 inches wide. The side portions of the side rails may have a height of 6 inches. The structural members of the base may be 3 inch square tubes, and the structural members of the frame may be 1½ inch square tubes. The load height of the side rails may be 19 inches, and the height of the front wall may be 14 inches. The overall height of the frame and base may be 32 inches. The bottom of the base may be 6⅞ inches from the floor, and the hinges of the frame may be 12⅞ inches from the bottom of the base.

While a preferred embodiment of the invention has been shown and described, it will be apparent from those skilled in the art that modifications can be made without departing from the principles and spirit of the invention, the scope of which is defined in the accompanying claims.

The invention claimed is:

1. Tilt rack apparatus comprising a base, a frame supported on the base for pivotal movement between a first, substantially horizontal position, and a second, tilted position in which one end of the frame approaches one end of the base, the pivotal movement being about an axis that is fixed at a middle region of the frame, a latch mechanism to releasably hold the frame in each of the first and second positions, and a return mechanism that moves the frame from the second position to the first position automatically when the latch mechanism is released with the frame in the second position.

2. Tilt rack apparatus according to claim 1, wherein the base and the frame are substantially rectangular, with corresponding sides of the base and the frame substantially parallel and corresponding ends of the base and the frame substantially parallel when the frame is in the first position.

3. Tilt rack apparatus according to claim 2, wherein the frame is pivotally supported on the base by hinges mounted on posts extending upwardly from the base.

4. Tilt rack apparatus according to claim 3, wherein the posts at opposite sides of the base are substantially equidistant from the opposite ends of the base.

5. Tilt rack apparatus according to claim 3, wherein the base comprises a pair of substantially parallel structural members at opposite sides of the base and a pair of substantially parallel structural members at opposite ends of the base.

6. Tilt rack apparatus according to claim 5, wherein the base further comprises an intermediate structural member extending between the structural members at opposite ends of the base and wherein the posts comprise two pairs of posts at respective sides of the base, one post of each pair extending upwardly from a structural member at a side of the base and the other post of each pair extending upwardly from the intermediate structural member.

7. Tilt rack apparatus according to claim 2, wherein the base comprises a pair of substantially parallel structural members at opposite sides of the base and a pair of substantially parallel structural members at opposite ends of the base.

8. Tilt rack apparatus according to claim 2, wherein the frame comprises a pair of side rails having substantially coplanar floor portions and outer side portions projecting upwardly from the floor portions to provide an open space extending between the outer side portions, so that a container can be supported on the floor portions between the outer side portions, and further comprises an end wall at said one end of the frame.

9. Tilt rack apparatus according to claim 8, wherein ends of the rails opposite to said one end of the frame are open.

10. Tilt rack apparatus according to claim 8, wherein the frame comprises a pair of substantially parallel structural members extending between opposite ends of the rails, respectively.

11. Tilt rack apparatus according to claim 2, wherein the base is supported on casters at four corners of the base, the casters at one end of the base being swivel casters and the casters at the opposite end of the base being rigid casters.

12. Tilt rack apparatus according to claim 1, wherein the latch mechanism comprises a foot-operated member pivotally supported at said one end of the base and having a pedal portion and an upwardly extending rod portion, wherein the frame has a front wall with a pair of vertically spaced through-holes and an upper end of the rod portion has a projection disposed for alignment with one or the other of the through-hole selectively, and wherein the latch mechanism is spring biased to urge the projection of the rod portion into one or the other of the through-holes aligned therewith.

13. Tilt rack apparatus according to claim 1, further comprising a releasable floor lock for holding the tilt rack apparatus at a desired position.

14. Tilt rack apparatus according to claim 1, wherein the return mechanism comprises a pair of shock absorbers adjacent to opposite sides of the base and pivotally connected between the base and the frame, the shock absorbers including elements that provide power to move the frame from the second position to the first position automatically when the latch mechanism is released with the frame in the second position.

15. Tilt rack apparatus according to claim 8, further comprising a container with a bottom supported on the rails, with sidewalls adjacent to respective side portions of the rails, an end wall adjacent to said one end of the frame and an opposite end wall adjacent to the opposite end of the frame.

16. Tilt rack apparatus according to claim 15, wherein the end wall of the container adjacent to said one end of said frame has a portion that pivots downwardly to provide an opening into the container.

17. Tilt rack apparatus comprising:

a base;

a frame supported on the base for pivotal movement between a first, substantially horizontal position, and a second, tilted position in which one end of the frame approaches one end of the base, the pivotal movement being about an axis that is fixed at a middle region of the frame, the frame comprising a pair of substantially parallel side rails having substantially coplanar floor portions and upwardly projecting outer side portions, and an end wall at said one end of the frame, ends of the side rails opposite to said one end of the frame being open, whereby a container can be placed on the floor portions of the side rails, in a space extending between the outer side portions, via the open ends of the side rails;

a latch mechanism to releasably hold the frame in each of the first and second positions;

and a return mechanism that moves the frame from the second position to the first position automatically when the latch mechanism is released with the frame in the second position, the return mechanism comprising a pair of shock absorbers pivotally connected between the base and the frame and including elements that provide power to move the frame from the second position to the first position automatically when the latch mechanism is released with the frame in the second position.

18. Tilt rack apparatus according to claim 17, wherein the shock absorbers are gas-spring shock absorbers.

19. Tilt rack apparatus according to claim 17, wherein the latch mechanism comprises a spring-biased foot-operated member that is pivotally supported at said one end of the base and that engages cooperable elements on the frame to hold the frame in one or the other of the first and second positions until the foot-operated member is operated against the spring bias.

20. Tilt rack apparatus according to claim 17, further comprising a container with a bottom supported on the floor portions of the side rails with sidewalls adjacent to respective side portions of the rails, an end wall adjacent to said one end of the frame and an opposite end wall adjacent to the opposite end of the frame, wherein the end wall of the container adjacent to said one end of the frame has an opening through which material in the container can be discharged when the frame is in the second, tilted position.

\* \* \* \* \*